(12) United States Patent
Long et al.

(10) Patent No.: US 10,914,997 B2
(45) Date of Patent: Feb. 9, 2021

(54) ARRAY SUBSTRATE, DISPLAY PANEL AND DISPLAY DEVICE

(71) Applicant: BOE TECHNOLOGY GROUP CO., LTD., Beijing (CN)

(72) Inventors: Chunping Long, Beijing (CN); Yongda Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 401 days.

(21) Appl. No.: 15/751,461

(22) PCT Filed: Jul. 18, 2017

(86) PCT No.: PCT/CN2017/093366
§ 371 (c)(1),
(2) Date: Feb. 8, 2018

(87) PCT Pub. No.: WO2018/040769
PCT Pub. Date: Mar. 8, 2018

(65) Prior Publication Data
US 2020/0225527 A1    Jul. 16, 2020

(30) Foreign Application Priority Data
Aug. 31, 2016    (CN) .................... 2016 2 1024899 U

(51) Int. Cl.
*G02F 1/1362* (2006.01)
*G02F 1/1345* (2006.01)
(Continued)

(52) U.S. Cl.
CPC ........ *G02F 1/13624* (2013.01); *G02F 1/1368* (2013.01); *G02F 1/13452* (2013.01);
(Continued)

(58) Field of Classification Search
CPC ............ G02F 1/13624; G02F 1/13452; G02F 1/136286
See application file for complete search history.

(56) References Cited

U.S. PATENT DOCUMENTS

2003/0112398 A1    6/2003    Kim et al.
2007/0132675 A1*   6/2007    Asao .................... G09G 3/3607
                                                              345/80
(Continued)

FOREIGN PATENT DOCUMENTS

CN    101937155 A    1/2011
CN    102231025 A    11/2011
(Continued)

OTHER PUBLICATIONS

International Search Report and Written Opinion dated Sep. 30, 2017, for corresponding PCT Application No. PCT/CN2017/093366.

*Primary Examiner* — Sejoon Ahn
(74) *Attorney, Agent, or Firm* — Kinney & Lange, P.A.

(57) ABSTRACT

The present disclosure relates to technical field of display. There is disclosed an array substrate, a display panel and a display device. The array substrate includes a plurality of pixels arranged in an array. Two data lines are provided between every two columns of pixels adjacent to each other and a data line is provided at either side of each column of pixels. One gate line is provided between every two rows of pixels adjacent to each other. Each pixel includes two display domains arranged in a column direction and each display domain is correspondingly connected with a switch device.

12 Claims, 11 Drawing Sheets

(51) Int. Cl.
*G02F 1/1368* (2006.01)
*G09G 3/36* (2006.01)

(52) U.S. Cl.
CPC ..... *G02F 1/136286* (2013.01); *G09G 3/3607* (2013.01); *G09G 3/3614* (2013.01); *G09G 3/3677* (2013.01); *G02F 2001/136222* (2013.01); *G09G 2300/0426* (2013.01); *G09G 2300/0823* (2013.01)

(56) References Cited

U.S. PATENT DOCUMENTS

| | | | |
|---|---|---|---|
| 2007/0262941 A1* | 11/2007 | Jan | G09G 3/3614 345/96 |
| 2008/0239182 A1 | 10/2008 | Huang et al. | |
| 2009/0002591 A1* | 1/2009 | Yamazaki | G02F 1/1368 349/43 |
| 2009/0009677 A1* | 1/2009 | Yamazaki | G02F 1/1368 349/43 |
| 2009/0059142 A1* | 3/2009 | Cheng | G02F 1/133555 349/114 |
| 2009/0195495 A1* | 8/2009 | Hsu | G09G 3/3607 345/104 |
| 2012/0026151 A1* | 2/2012 | Kim | G09G 3/3614 345/212 |
| 2017/0219890 A1* | 8/2017 | Li | H01L 27/1259 |

FOREIGN PATENT DOCUMENTS

| | | |
|---|---|---|
| CN | 104238165 A | 12/2014 |
| CN | 106019747 A | 10/2016 |
| CN | 206020891 U | 3/2017 |

* cited by examiner

ARRAY SUBSTRATE, DISPLAY PANEL AND DISPLAY DEVICE

CROSS-REFERENCE TO RELATED APPLICATIONS

The present application is the national phase of PCT Application No. PCT/2017/093366, which in turn claims priority to Chinese Patent Application No. 201621024899.1, filed on Aug. 31, 2016, entitled "ARRAY SUBSTRATE, DISPLAY PANEL AND DISPLAY DEVICE", which is incorporated herein by reference in its entirety.

BACKGROUND OF THE DISCLOSURE

Field of the Disclosure

Embodiments of the present disclosure relate to technical field of display, and particularly to an array substrate, a display panel and a display device.

Description of the Related Art

Currently, a multi-domain display mode is usually adopted in some wide viewing angle liquid crystal displays to increase a viewing angle of the display. The multi-domain display mode means a sub-pixel is divided into a plurality of regions and liquid crystal molecules in different regions are deflected by different angles. Compared with a conventional single-domain display mode, the multi-domain display mode may reduce difference of contrasts between different viewing angles caused due to deflection of all liquid crystal molecules by the same angle, and thus may increase viewing angle.

As for a liquid crystal display where a multi-domain display mode is adopted, it is necessary to provide different pixel voltages in a single pixel of an array substrate of the display so as to achieve different deflection angles of the liquid crystal molecules. A pixel in the array substrate is formed by a region that is enclosed by two adjacent gate lines and two adjacent data lines on the array substrate. A pixel is generally controlled by one or two thin film transistors at a crossing position where a gate line crosses a data line. In order to provide different pixel voltages in a single pixel, it is current in a conventional structure to provide pixel voltage signals with different polarities by a same data line in time-sharing mode by using one or two thin film transistors in one pixel. However, usage of such pixel structure in an array substrate will reduce a charging time period of the pixel and will not be favor of achieving a high-frequency drive.

SUMMARY

The present disclosure provides an array substrate, a display panel and a display device.

Embodiments of the present disclosure provide an array substrate that includes a plurality of pixels arranged in an array, wherein:

two data lines are provided between every two columns of pixels adjacent to each other and a data line is provided at either side of each column of pixels;

one gate line is provided between every two rows of pixels adjacent to each other;

each pixel comprises at least two display domains and each display domain is correspondingly connected with a switch device;

each of the display domains in each pixel is connected with a gate line at a side of the pixel by a corresponding switch device; and each of the display domains in each pixel is connected with a data line that is adjacent to the pixel and at a side of the pixel by a corresponding switch device.

In the array substrate provided by the present disclosure, two data lines are provided between every two columns of pixels adjacent to each other and a data line is provided at either side of each column of pixels; a gate line is provided between every two rows of pixels adjacent to each other and a data line is provided at either side of each column of pixels; each pixel comprises at least two display domains and each display domain is correspondingly connected with a switch device; each display domain in a pixel is connected with a gate line at a side of the pixel by a corresponding switch device and a gate line at at least one side of each pixel is connected with display domains in the corresponding pixel; each display domain in a pixel is connected with a data line that is close adjacent to the pixel and at a side of the pixel by a corresponding switch device and a data line at at least one side of each pixel is connected with with display domains in the corresponding pixel.

In an embodiment, the at least two display domains in each pixel are arranged in sequence in a row direction of the respective pixel; or the at least two display domains in each pixel are arranged in sequence in a column direction of the respective pixel; or the at least two display domains in each pixel are arranged in an array.

Further, the array substrate further includes a gate driver connected to each gate line and a source driver connected to each data line, the source driver comprising a positive polarity source driver and a negative polarity source driver.

Further, the source driver that is connected with the data line corresponding to the at least two display domains in one of any two pixels adjacent to each other in the row direction has a polarity opposite to that of the source driver connected with the data line corresponding to the at least two display domains in the other of the any two pixels adjacent to each other in the row direction.

Further, the source driver that is connected with the data line corresponding to the at least two display domains in one of any two pixels adjacent to each other in the column direction has a polarity opposite to that of the source driver connected with the data line corresponding to the at least two display domains in the other of any two pixels adjacent to each other in the column direction.

Further, the source driver that is connected with the data line corresponding to one of any two display domains adjacent to each other in the row direction has a polarity opposite to that of the source driver connected with the data line corresponding to the other of the any two display domains adjacent to each other in the row direction.

Further, the source driver that is connected with the data line corresponding to one of any two display domains adjacent to each other in the column direction has a polarity opposite to that of the source driver connected with the data line corresponding to the other of the any two display domains adjacent to each other in the column direction.

Further, the switch device is a thin film transistor.

Further, channels in the thin film transistors corresponding respectively to the at least two display domains in each pixel have a same width to length ratio; or channels in the thin film transistors corresponding respectively to the at least two display domains in each pixel have width to length ratios that are different from one another.

The present disclosure further provides a display panel including the above array substrate and a color filter substrate that is assembled and connected with the array substrate, wherein the color filter substrate comprises a plurality of sub-pixel regions that are arranged in an array and a orthographic projection of each sub-pixel region on the array substrate covers two display domains adjacent to each other.

In an embodiment, the two display domains adjacent to each other that are covered by the orthographic projection of each sub-pixel region on the array substrate are located in a same pixel of the array substrate.

In an embodiment, the two display domains adjacent to each other that are covered by the orthographic projection of each sub-pixel region on the array substrate are located in two pixels that are adjacent to each other on the array substrate.

The present disclosure further provides a display device including the above display panel.

BRIEF DESCRIPTION OF THE DRAWINGS

FIG. 3a is a distribution view of polarities of voltage signals applied to each pixel on the array substrate as shown in FIG. 1a;

FIG. 3b is a distribution view of polarities of voltage signals applied to each pixel on the array substrate as shown in FIG. 2a;

DETAILED DESCRIPTION OF PREFERRED EMBODIMENTS

Technical schemes in the present disclosure will be clearly and completely described in combination with the drawings in embodiments of the present disclosure below. Obviously, the illustrated embodiments just are a part of embodiments of the present disclosure but are not all of embodiments of the present disclosure. Based on the disclosed embodiments, others embodiments that can be obtained by those skilled in the art without inventive labor belong to the scope of the present disclosure.

It is noted that a shape and size of a component in drawings do not reflect its real scale but only intend to illustrate content of the present disclosure.

Figure 1A:
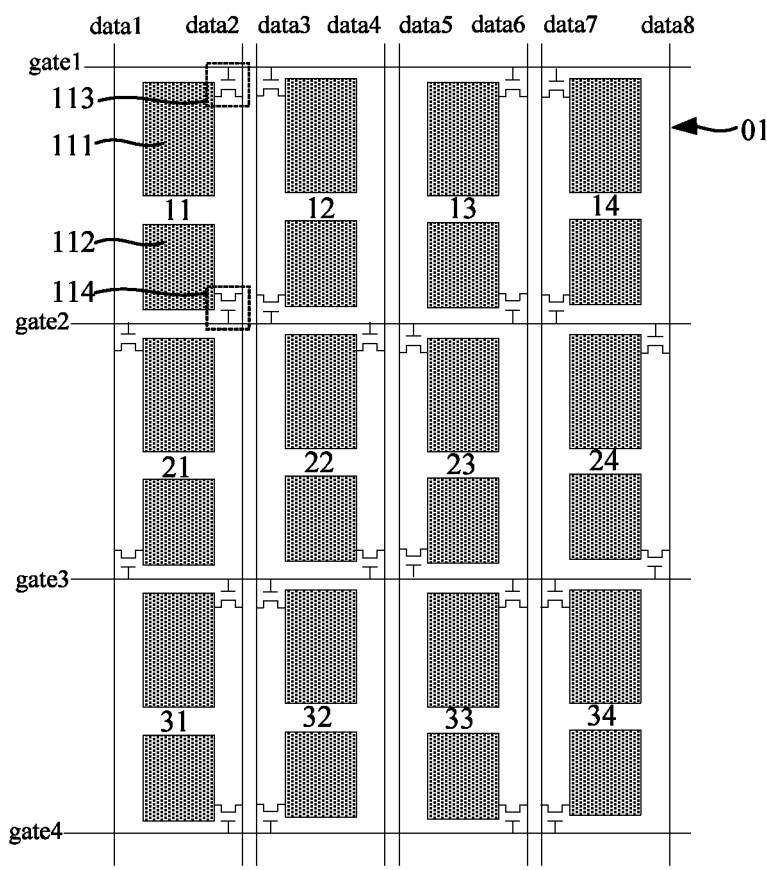
FIG. 1a is a structural schematic view of an array substrate according to an embodiment of the present disclosure.
Figure 1B:
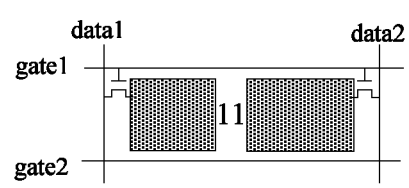
FIG. 1b is a schematic view of arrangement manner of display domains in a single pixel.
Figure 1C:
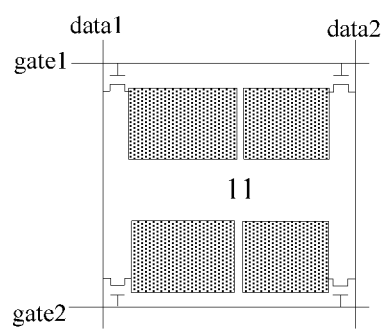
FIG. 1c is a schematic view of arrangement manner of display domains in a single pixel.
Figure 1D:
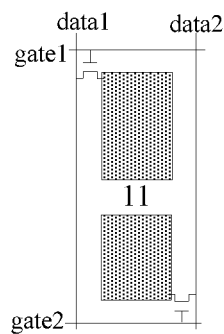
FIG. 1d is a schematic view of arrangement manner of display domains in a single pixel.

Referring to FIG. 1a, a structural schematic view of an array substrate according to an embodiment of the present disclosure is illustrated. The array substrate 01 includes a plurality of pixels arranged in an array. For example, as shown in FIG. 1a, pixels 11~14 located in a first row and pixels 11~31 located in a first column each are surrounded and formed by two data lines and two gate lines that are crossed one another. In FIG. 1, for example, the pixel 11 is surrounded and formed by gate lines gate 1, gate 2 and data lines data 1, data 2;

two data lines are provided between every two columns of pixels adjacent to each other and a data line is provided at either side of each column of pixels; referring to a first column of pixels 11~31 and a second column of pixels 12~32 as shown in FIG. 1a, two data lines data 2 and data 3 are provided between the first column of pixels 11~31 and the second column of pixels 12~32, the data lines data 1 and data 2 are provided at either side of the first column of pixels 11~31, and data lines data 3 and data 4 are provided at either side of the second column of pixels 12-32;

a gate line is provided between every two rows of pixels adjacent to each other and data lines are provided at either side of each row of pixels; referring to a first row of pixels 11~14 and a second row of pixels 21~24 as shown in FIG. 1a, a gate line gate 2 is provided between the first row of pixels 11~14 and the second row of pixels 21~24, gate lines gate 1 and gate 2 are provided at either side of the first row of pixels 11~14, and gate lines gate 2 and gate 3 are provided at either side of the second row of pixels 21~24;

each pixel includes two display domains and each display domain is correspondingly connected with a switch device; a display domain is thus a region, which is controlled by a switch device, of a pixel. In practice, a pixel electrode that is configured to control deflection of liquid crystal molecules in a display domain is provided in the display domain. Referring to a pixel 11 as shown in FIG. 1a, two display domains 111 and 112 are provided in the pixel 11, the display domain 111 is correspondingly connected with a switch device 113 and the display domain 112 is correspondingly connected with a switch device 114;

In practice, at least two display domains are provided in each pixel. A plurality of display domains may also be provided in a pixel. The display domains may be arranged in various manners in the corresponding pixel, and specifically, for example, referring to FIGS. 1b and 1d, FIG. 1d illustrates an arrangement manner of display domains in a single pixel, in which two display domains in each pixel are arranged in a column direction of the corresponding pixel in sequence. Alternatively, referring to FIG. 1b, an arrangement manner of display domains in a single pixel is illustrated in FIG. 1b, in which two display domains in each pixel are arranged in a row direction of the corresponding pixel in sequence. Alternatively, referring to FIG. 1c, an arrangement manner of display domains in a single pixel is illustrated in FIG. 1c, in which four display domains are provided in each pixel and are arranged in an array;

each of the display domains in each pixel is connected with a gate line at a side of the pixel by a corresponding switch device such that the display domains in the pixel may be connected with gate lines at a side or either side of the pixel. Specifically, referring to the pixel 11 as shown in FIG. 1a, the display domain 111 in the pixel 11 is connected with the gate line gate 1 by the corresponding switch device 113 and the display domain 112 is connected with the gate line gate 2 by the corresponding switch device 114. In addition, referring to FIG. 1b, the two display domains in the pixel 11 are both connected with the gate line gate 1;

each of display domains in each pixel is connected with a data line located at a side of the pixel and adjacent to the pixel by a corresponding switch device such that the display domains in the pixel may be connected with data lines at a side or either side of the corresponding pixel. Specifically, referring to the pixel 11 as shown in FIG. 1a, the display domain 111 is connected with a data line data 2 by a corresponding switch device 113 and the display domain 112 is also connected with the data line data 2 by a corresponding switch device 114. In addition, referring to FIG. 1b or FIG. 1d, the two display domains in the pixel 11 are respectively connected with the data lines data 1 and data 2. In a situation where a plurality of display domains arranged in an array in a pixel, the display domains may be connected with the gate lines and data lines in similar manner to the situation where two display domains are provided in a pixel, that is, the plurality of display domains arranged in an array may be connected with a same gate line or a same data line, or, two parts of the plurality of display domains arranged in an array may be connected with different gate lines or data lines.

It is noted that in the array substrate 01 according to the embodiment, the row direction is a direction in which the gate line extends and the column direction is a direction in which the data line extends.

In the array substrate 01 according to the disclosure, two data lines are provided between every two columns of pixels adjacent to each other and data lines are provided at either side of each column of pixels; a gate line is provided between every two rows of pixels adjacent to each other and data lines are provided at either side of each row of pixels; each pixel includes at least two display domains and each display domain is correspondingly connected with a switch device; in each pixel, each display domain is connected, by a corresponding switch device, with a gate line at a side of the corresponding pixel, and the gate line at at least one side of each pixel is connected with display domain(s) in the corresponding pixel; in each pixel, each display domain is connected with a data line, which is adjacent to the pixel, at a side of the pixel by a corresponding switch device, and data line at at least one side of the pixel is connected with display domain(s) in the corresponding pixel.

In the above array substrate, two data lines are provided between two columns of pixels adjacent to each other and data lines are provided at either side of each pixel. With this configuration, at least two display domains in each pixel may be provided with pixel voltage signals from different data lines, or, every two pixels adjacent to each other may be provided with pixel voltage signals from different data lines, and polarity of the pixel voltage signal provided by the data line corresponding to each display domain or each pixel may be adjusted such that polarities of the pixel voltage signals to adjacent display domains or adjacent pixels are different from each other, thereby solving the problem of reduced charging time of pixels due to provision of pixel voltage signals with different polarities by a same data line, and achieving a high-frequency drive and reducing power consumption of the display panel.

The array substrate according to the embodiment may achieve a dot-inversion drive in a multidomain liquid crystal display with low power consumption. A liquid crystal display panel may be driven in following manners including a frame inversion manner, a line inversion manner and a dot-inversion manner, the dot inversion manner means that for a frame of picture, a polarity of a voltage to each sub-pixel is opposite to polarities of voltages to four sub-pixels located adjacent to and around the sub-pixel. In a dot inversion manner, a liquid crystal display panel has less twinkle and crosstalk phenomenon and better display performance.

Implementation of dot inversion driving in the array substrate according to an embodiment is described in detail as following.

In practice, the array substrate in the embodiment further includes a gate driver connected with each of the gate lines and a source driver connected to each of the data lines. The source driver includes a positive polarity source driver and a negative polarity source driver.

Connections of the pixels to the source drivers are adjusted such that in any two pixels adjacent to each other in the row direction, a polarity of the source driver connected to the data line corresponding to at least two display domains in one of the two pixels is opposite to that of the source driver connected with the data line corresponding to the at least two display domains in the other of the two pixels, and meanwhile such that in any two pixels adjacent to each other in the column direction, a polarity of the source driver that is connected with the data line corresponding to the at least two display domains in one of the two pixels is opposite to that of the source driver connected with the data line corresponding to the at least two display domains in the other of the two pixels, thereby the pixel voltage signals applied to any two pixels adjacent to each other in the row direction and any two pixels adjacent to each other in the column direction have opposite polarities to achieve a dot-inversion drive in taking a pixel as unit.

An embodiment for the above drive manner may be referred to FIG. 1a, in which the display domains in each pixel are both connected with a same data line and the data line connected to the two display domains in one of the two pixels adjacent to each other in column direction is different from the data line connected to the two display domains in the other of the two pixels adjacent to each other in column direction; referring to the first column of pixels 11~31 as an example, for the pixels 11,21 that are adjacent to each other in the column direction, the display domains 111 and 112 in the pixel 11 are connected with the data line data 2 at a side of the first column of pixels 11~31 and the two display domains in the pixel 12 are connected with the data line data 1 at the other side of the first column of pixels 11~31;

For the pixels in a row, two display domains in a pixel in an odd-numbered column of pixels are connected with the data line at a first side of the corresponding column of pixels and two display domains in a pixel in an even-numbered column of pixels are connected with the data line at a second side of the corresponding column of pixels, and the first side and the second side may be different sides of a column, such as may be respectively a right side and a left side of the column. For example, specifically, for the pixels 11 and 13, respectively located in different odd-numbered columns, in the first row of pixels 11~14 as shown in FIG. 1, two display domains in the pixel 11 are connected with the data line data 2 at the first side of the corresponding first column of pixels 11~31, and two display domains in the pixel 13 are connected with the data line data 6 at the first side of the corresponding third column of pixels 13~33; for the pixels 12 and 14, respectively located in different even-numbered columns, two display domains in the pixel 12 are connected with the data line data 3 at the second side of the corresponding second column of pixels 12~32, and two display domains in the pixel 14 are connected with the data line data 7 at the second side of the corresponding fourth column of pixels 14-34.

Figure 3A:
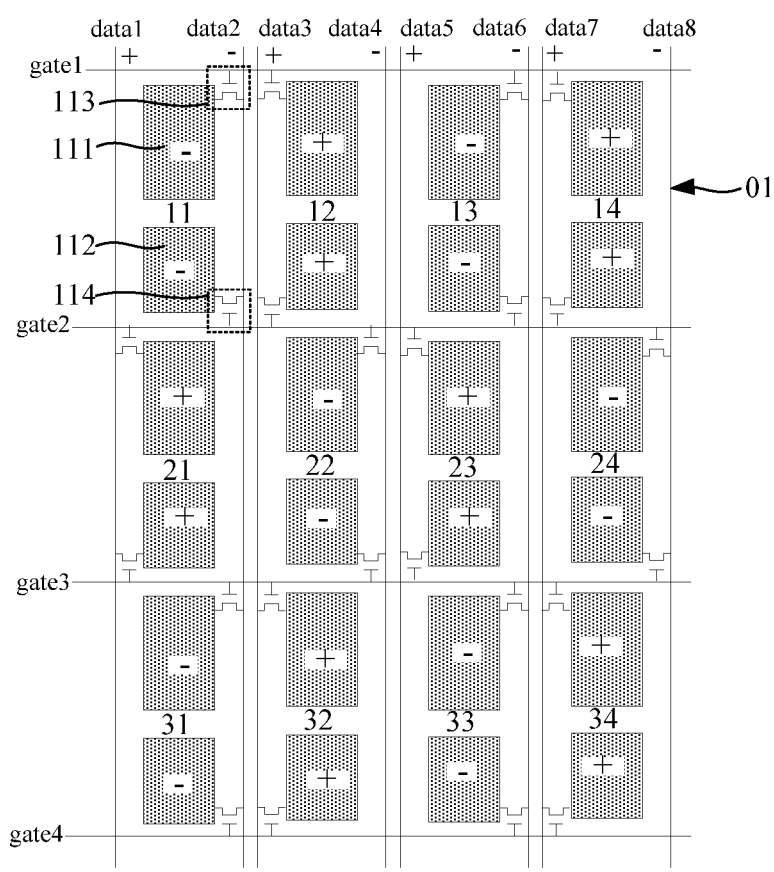

Referring to FIG. 3a, a distribution view of polarities of voltage signals applied to the pixels of the array substrate as shown in FIG. 1a. Two data lines between every two columns of pixels adjacent to each other are respectively connected with a positive polarity source driver and a negative polarity source driver, and two data lines at either side of a column of pixels are respectively connected with a positive polarity source driver and a negative polarity source driver. Specifically, referring to the first column of pixels 11-31 and the second column of pixels 12-32 as an example, the data line data 1 at one side of the first column of pixels 11-31 is connected with a positive polarity source driver and the data line data 2 at the other side of the first column of pixels 11-31 is connected with a negative polarity source driver. The data line data 3 at one side of the second column of pixels 12-32 is connected with a positive polarity source driver and the data line data 4 at the other side of the second column of pixels 12-32 is connected with a negative polarity source driver. With this configuration, the data line data 2 between the first column of pixels 11-31 and the second column of pixels 12-32 is connected with a negative polarity source driver while the data line data 3 is connected with a positive polarity source driver;

the data line connected to two display domains in one of the two pixels adjacent to each other in the column direction is different from the data line connected to two display domains in the other of the two pixels adjacent to each other in the column direction, and further, two display domains of a pixel in an odd-numbered column of pixels are connected with the data line at a first side of the corresponding column of pixels while two display domains of a pixel in an even-numbered column of pixels are connected with the data line at a second side of the corresponding column of pixels, such that voltage signals applied to two pixels adjacent to each other in the row direction have opposite polarities and voltage signals applied to two pixels adjacent to each other in the column direction have opposite polarities. The first side and the second side may be difference sides of a column, such as, may be a left side and a right side of the column respectively. Specifically, referring to the pixel 22 in FIG. 3a as an example, two display domains in the pixel 22 are connected with the data line data 4 that supplies a negative polarity voltage signal such that the pixel 22 is applied with the negative polarity voltage signal; the pixels 11 and 32 that are adjacent to the pixel 22 in the column direction is connected with the data line data 3 that supplies a positive polarity voltage signal such that the pixels 12 and 32 are applied with the positive polarity voltage signal; the pixel 21 that is adjacent to the pixel 22 in the row direction is connected with the data line data 1 that supplies a positive polarity voltage signal while the other pixel 23 that is adjacent to the pixel 22 in the row direction is connected with the data line data 5 that supplies a positive polarity voltage signal such that the pixels 21 and 23 are applied with a positive polarity voltage signal. With this configuration, the polarities of voltage signals applied to pixels that are adjacent to the pixel 22 in both the row direction and in the column direction are different from the polarity of the voltage signal applied to the pixel 22, thereby achieving a dot inversion drive in taking a pixel as a unit.

Figure 2A:
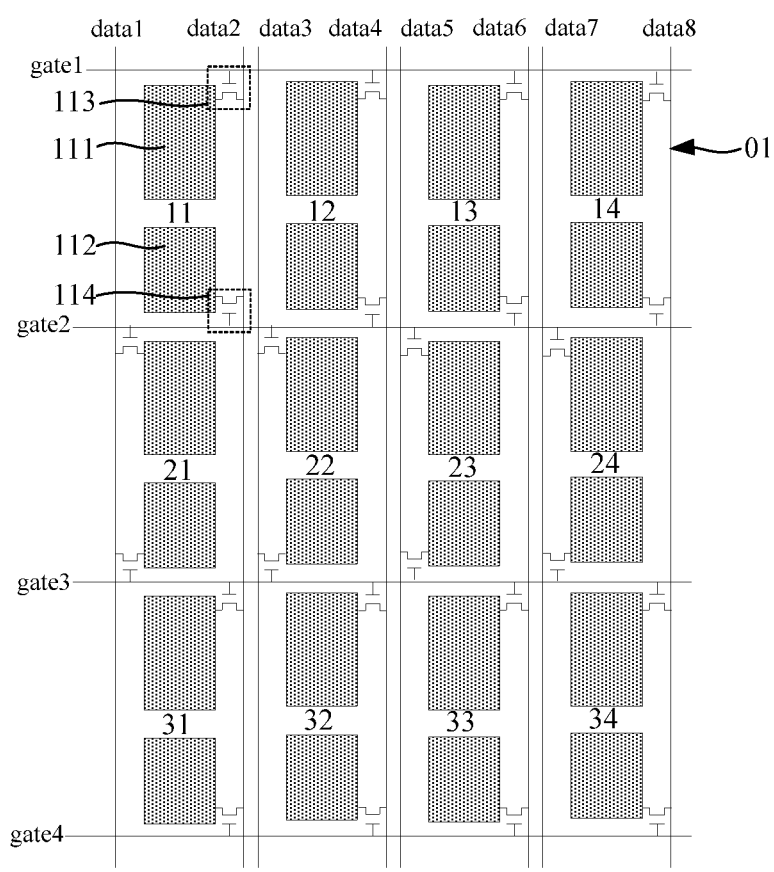
FIG. 2a is another structural schematic view of an array substrate according to an embodiment of the present disclosure.

In addition, a dot inversion drive in a pixel as a unit may be achieved by the structure of the array substrate as shown in FIG. 2a. FIG. 2a illustrates a structural schematic view of the array substrate in another structure according to the embodiment. Two display domains in each of pixels in a same row may be connected with data lines at a same side of the respective columns of pixels respectively. For two pixels adjacent to each other in the column direction, two display domains in one of the two pixels are connected with a data line different from a data line to which two display domains in the other of the two pixels are are connected. Specifically, referring to the first row of pixels 11-14 as an example, pixels 11, 12, 13, 14 are all connected with the data lines at the first side of the corresponding columns of pixels respectively.

Figure 3B:
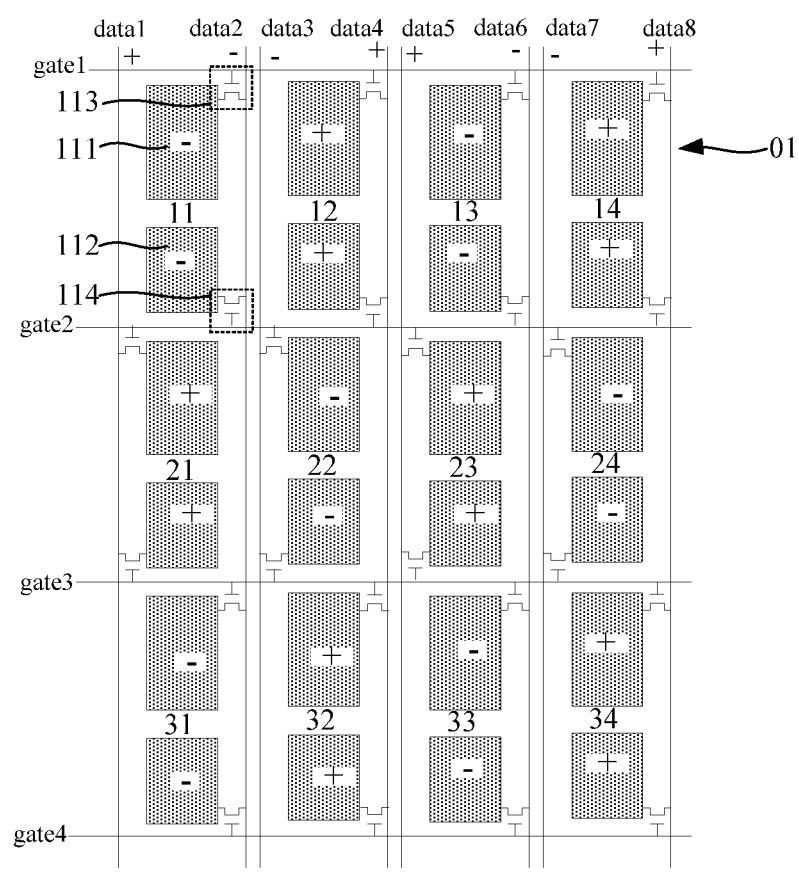

As for the array substrate of the structure as shown in FIG. 2a, when it is operated for a dot inversion drive in a unit of pixel, two data lines between every two columns of pixels adjacent to each other are connected with source drivers with a same polarity and if assuming the two data lines between every two columns of pixels adjacent to each other as a set, the source drivers that are respectively connected with every adjacent two sets of data lines have opposite polarities. Specifically, referring to FIG. 3b, FIG. 3b illustrates distribution view of polarities of voltage signals applied to the pixels on the array substrate as shown in FIG. 2a. Taking the pixel 22 as shown in FIG. 3b as an example, the polarities of the voltage signals applied to the pixels adjacent to the pixel 22 in both the row direction and the column direction are opposite to that for the pixel 22, thereby achieving a dot inversion drive taking a pixel as a unit.

In addition to the above dot inversion drive taking a pixel as a unit, a dot inversion drive taking a display domain as a unit may be obtained as following. Connections between pixels and a source driver are adjusted such that for any two display domains adjacent to each other in the row direction, a source driver, to which a data line corresponding to one of the two display domains is connected, has a polarity opposite to a polarity of a source driver to which a data line corresponding to the other of the two display domains is connected, and that for any two display domains adjacent to each other in the column direction a source driver, to which a data line corresponding to one of they two display domains is connected has a polarity opposite to a polarity of a source driver to which a data line corresponding to the other of the two display domains is connected, thereby achieving a dot inversion drive taking a display domain as a unit.

Figure 2B:
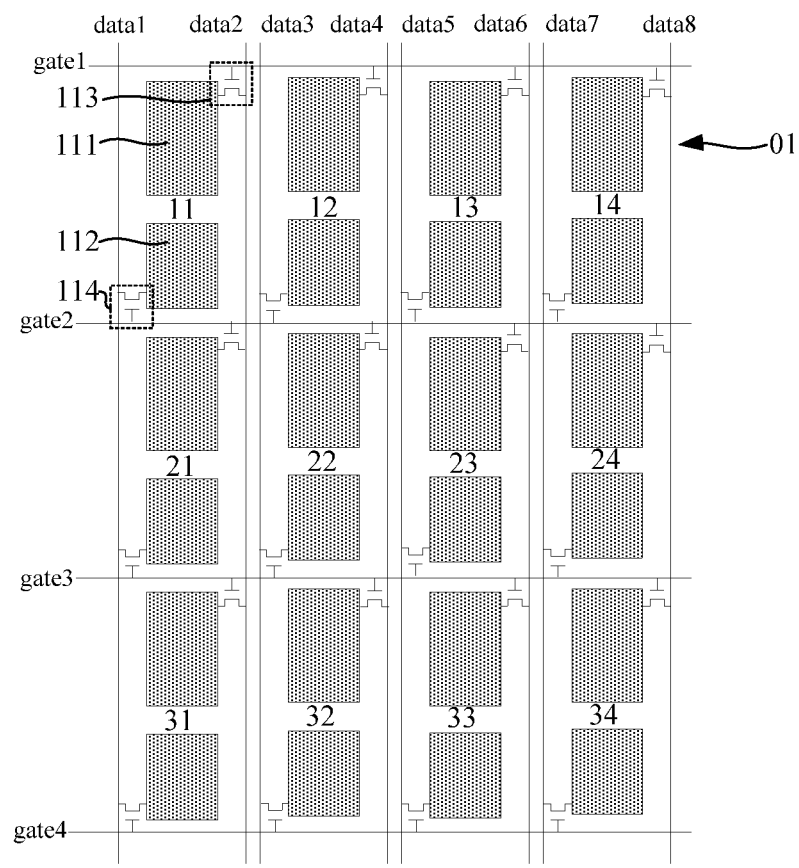
FIG. 2b is another structural schematic view of an array substrate according to an embodiment of the present disclosure.
Figure 3C:
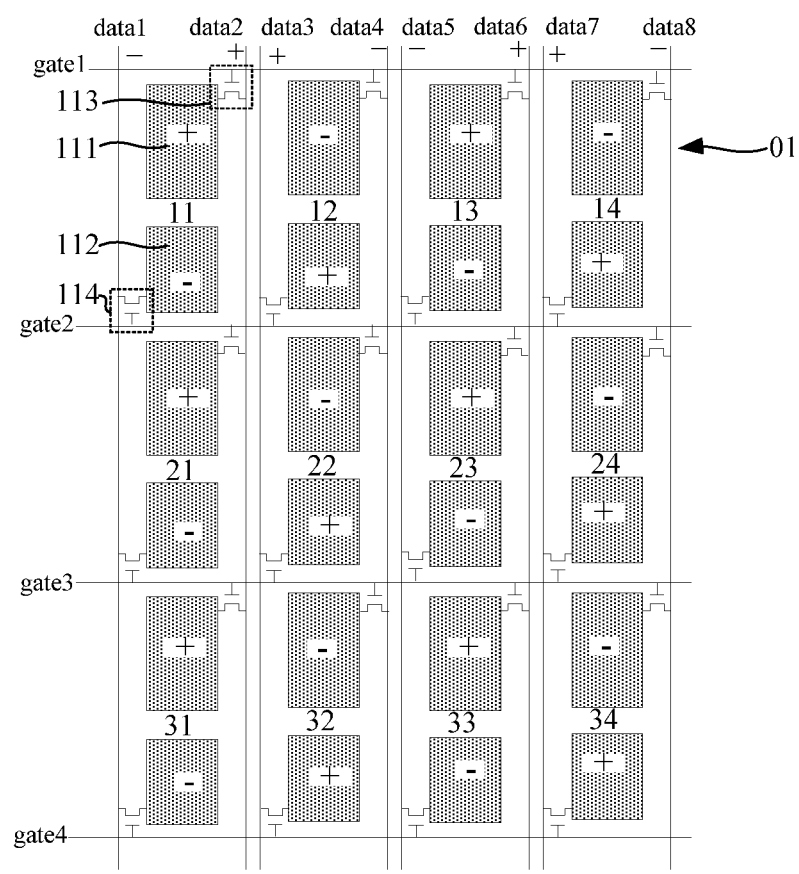
FIG. 3c is a distribution view of polarities of voltage signals applied to each pixel on the array substrate as shown in FIG. 2b.

An implementation of the above drive manner may refer to FIG. 2b. FIG. 2b is a schematic view of the array substrate in another structure according to the embodiment. In the array substrate as shown in FIG. 2b, any two display domains adjacent to each other in a same column are respectively connected with different data lines and display domains in a same row are all connected with the data lines at the same side of the corresponding pixels. Referring to FIG. 3c, FIG. 3c illustrates a distribution view of polarities of voltage signals applied to the pixels in the array substrate as shown in FIG. 2b. As for the array substrate in the structure as shown in FIG. 2b, when it is operated for a dot inversion drive taking a pixel as a unit, two data lines between every two columns of pixels adjacent to each other are connected with source drivers with the same polarity and if assuming the two data lines between every two columns of pixels adjacent to each other as a set, the source drivers that are respectively connected with every two sets of data lines adjacent to each other have opposite polarities. With this configuration, in the array substrate as shown in FIG. 2b, pixel voltage signals applied to the two display domains adjacent to each other in the column direction have opposite polarities, thereby achieving a dot inversion drive taking a display domain as a unit.

Figure 2C:
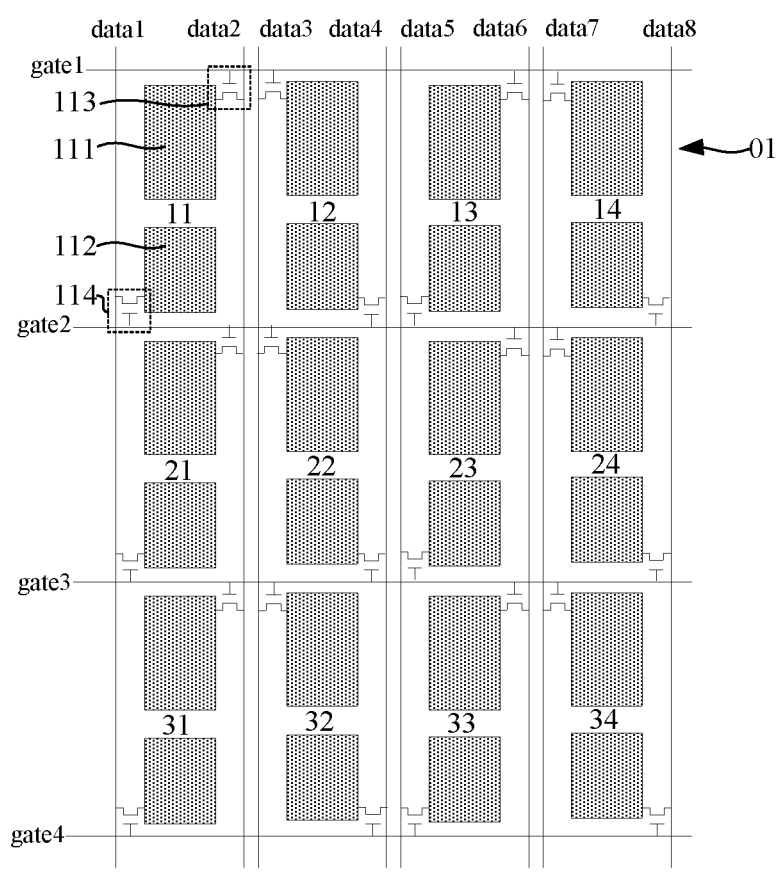
FIG. 2c is another structural schematic view of an array substrate according to an embodiment of the present disclosure.
Figure 3D:
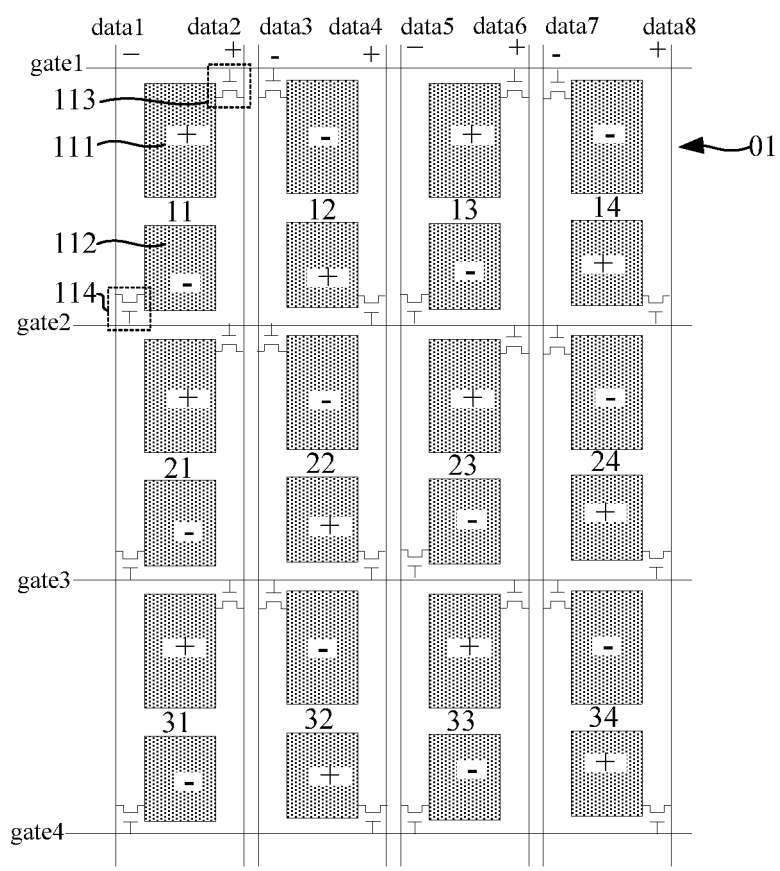
FIG. 3d is a distribution view of polarities of voltage signals applied to each pixel on the array substrate as shown in FIG. 2c.

In addition, referring to FIG. 2c, FIG. 2c is a schematic view of an array substrate in another structure according to the embodiment. In the array substrate as shown in FIG. 2c, any two display domains adjacent to each other in a same column are respectively connected with different data lines, and as for display domains in the same row, display domains in an odd-numbered column are connected with the data lines at the first side of the corresponding pixels while display domains in an even-numbered column are connected with the data lines at the second side of the corresponding pixels. The first side and the second side may be different sides of an column, such as, a left side and a right side of the column respectively. Referring to FIG. 3d, FIG. 3d illustrates a distribution view of polarities of voltage signals applied to the pixels in the array substrate as shown in FIG. 2c. As for the array substrate in the structure as shown in FIG. 2c, when it is operated for a dot inversion drive taking a display domain as a unit, source drivers that are respectively connected with two data lines between every two columns of pixels adjacent to each other have opposite polarities, and source drivers that are respectively connected with two adjacent data lines located at either side of a column of pixels have opposite polarities. With this configuration of the array substrate as shown in FIG. 2c, polarities of pixel voltage signals applied to two display domains adjacent to each other in the row direction are different from each other, thereby achieving a dot inversion drive taking a display domain as a unit.

Compared with the array substrate in prior art, when the above array substrate operates in a dot inversion display mode, it is not necessary to provide voltage signals with different polarities from a same data line in a time-share mode, thereby reducing power consumption.

In practice, in the above array substrate according to the embodiment, the switch device is a thin film transistor and a source or a drain of each thin film transistor is connected with a data line at a side of a corresponding pixel.

In each pixel, areas of two display domains may be the same as each other, or may be different from each other. For example, in the array substrate as shown in FIG. 1, sizes of two display domains in each pixel are different from each other.

Further, a width to length ratio of a channel of a thin film transistor may be set depending on an area of a display domain. In an embodiment where two display domains in each pixel have the same area, the channels of the thin film transistors respectively corresponding to the two display domains are identical in width to length ratio; in an embodiment where two display domains in each pixel have different areas, the channels of the thin film transistors respectively corresponding to the two display domains have different width to length ratios. A ratio between areas of two pixels adjacent to each other in the column direction is equal to a ratio between widths of the channels of the thin film transistors respectively corresponding to the two pixels, so as to ensure synchronization in charging or discharging of the two pixels and thus achieve charging of the pixels in the same time period for the display domains with different areas.

Figure 4:
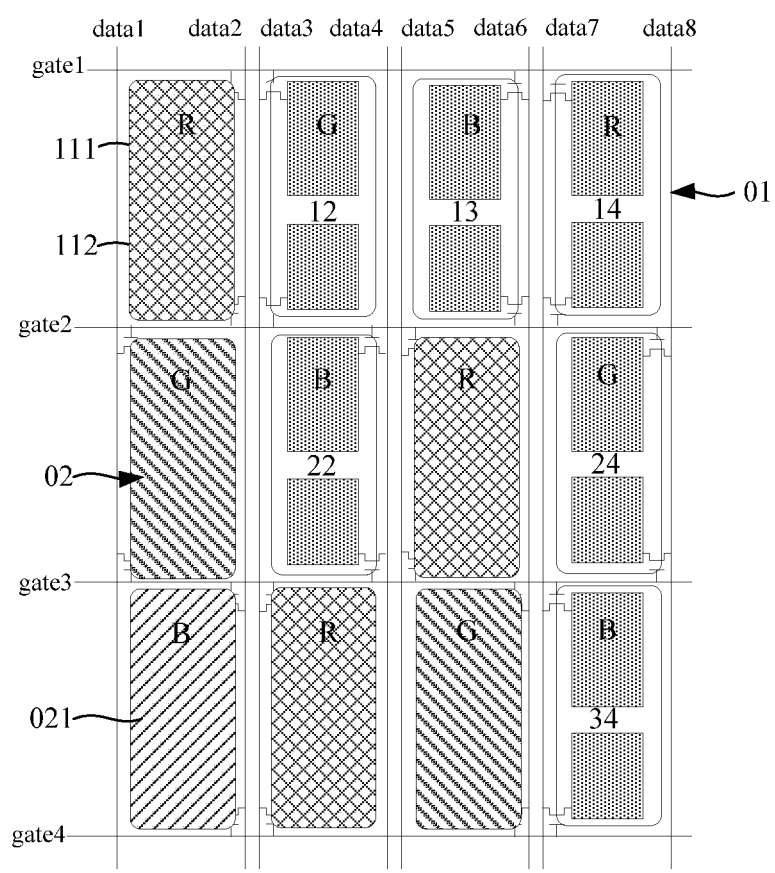
FIG. 4 is a structural schematic view of a display panel according to another embodiment of the present disclosure.
Figure 5:
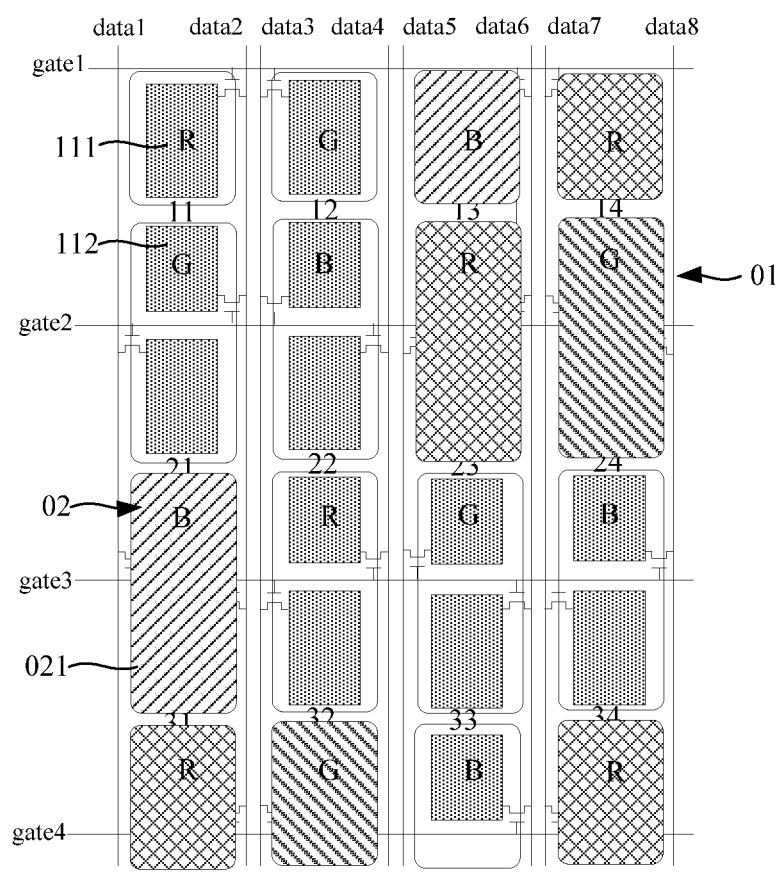
FIG. 5 is a structural schematic view of a display panel according to another embodiment of the present disclosure.

Based on the same inventive concept, another embodiment of the present disclosure provides a display panel. Referring to FIG. 4 and FIG. 5, FIG. 4 and FIG. 5 are respectively structural schematic views of a display panel according to the embodiment. The display panel includes the array substrate 01 according to the above embodiment and a color filter substrate 02 that is assembled and connected with the array substrate as a cell. The color filter substrate includes a plurality of sub-pixel regions arranged in an array, and the sub-pixel region is a region on the color filter substrate that is defined by a light transmission sub-pixel. In practice, the sub-pixel may be any one of three color sub-pixels including a red sub-pixel, a green sub-pixel and a blue sub-pixel. A orthographic projection of each sub-pixel region on the array substrate covers two display domains adjacent to each other.

In the above display panel, a orthographic projection of each sub-pixel region, on the array substrate, of the color filter substrate covers two display domains adjacent to each other, and two display domains in each sub-pixel region may be supplied with pixel voltage signals respectively by different data lines. Polarity of a pixel voltage signal applied by a data line corresponding to each display domain or each pixel may be adjusted to make polarities of pixel voltage signals applied to adjacent display domains or adjacent pixels be different from one another, thereby solving the problem of reduced charging time of pixels due to provision of pixel voltage signals with different polarities from a same data line, and achieving a high-frequency drive and reducing power consumption of the display panel.

Meanwhile, referring to implementation of the dot inversion drive in the above embodiment, when the dot inversion drive is achieved by the display panel, it is not necessary to provide voltage signals with different polarities from a same data line in a time-share mode, thereby reducing power consumption.

In practice, a orthographic projection, on the array substrate, of each sub-pixel region of the color filter substrate covering two display domains adjacent to each other may be achieved in two following examples.

Example 1: referring to FIG. 4, two display domains that are covered by a orthographic projection of a sub-pixel region on the array substrate are located in a same pixel in the array substrate, that is, each sub-pixel region of the color filter substrate is aligned with a region that is defined by two adjacent gate lines and two adjacent data lines, which cross one another. It is known by referring to the above dot inversion drive that two display domains in a sub-pixel region is supplied with voltage signals of a same polarity by a same data line. Applying voltage signals of a same polarity to different display domains in a same sub-pixel region to control deflection of liquid crystal molecules in the display domains is favor of a wide viewing angle display of the display panel.

Example 2: referring to FIG. 5, two display domains that are covered by a orthographic projection of a sub-pixel region on the array substrate are located in two adjacent pixels of the array substrate. In practice, a sub-pixel region of the color filter substrate and a pixel of the array substrate are aligned with each other in the row direction and are staggered in the column direction, that is, they are staggered by a display domain, or, a sub-pixel region of the color filter substrate and a pixel in the array substrate are aligned with each other in the column direction and are staggered in the row direction, that is, they are staggered by a display domain. It is known by referring to the above dot inversion drive that voltage signals with opposite polarities are applied to two display domains in a sub-pixel region by the two different data lines. Applying voltage signals with opposite polarities to different display domains in a same sub-pixel region to control deflection of liquid crystal molecule in the display domains is favor of a wide viewing angle display of the display panel.

It is noted that in the above embodiments, sub-pixels regions of the color filter substrate may be arranged in a RGB-order arrangement as shown in FIG. 4 and FIG. 5. In practice, arrangement of sub-pixel regions is not limited to the above manners.

Based on the same inventive conception, an embodiment of the present disclosure provides a display device including the display panel according to the above embodiments.

Obviously, those skilled in the art may make various modifications and changes to the disclosed embodiments without departing from the spirit and scope of the present disclosure. The present disclosure intends to include these modifications and changes if they belong to the scope of the claims and their equivalents.

The invention claimed is:

1. An array substrate comprising:
a plurality of pixels arranged in an array, wherein a plurality of data lines are provided with two data lines between every two columns of pixels adjacent to each other and data lines at opposite sides of each column of pixels; a plurality of gate lines are provided with one gate line between every two rows of pixels adjacent to each other; each pixel of the plurality of pixels comprises at least two display domains and each display domain is correspondingly connected with a switch device; each of the display domains in each pixel is connected with one of the plurality of gate lines at a side of the pixel by a corresponding switch device; and each of the display domains in each pixel is connected with one of the plurality of data lines that is adjacent to the pixel and at a side of the pixel by a corresponding switch device;
wherein each switch device is a thin film transistor; and
wherein: channels in the thin film transistors corresponding respectively to the at least two domains in each pixel have a same width to length ratio: or channels in the thin film transistors corresponding respectively to the at least two domains in each pixel have width to length ratios that are different from one another.

2. The array substrate according to claim 1, wherein
the at least two domains in each pixel are arranged in sequence in a row direction of the the pixel; or
the at least two domains in each pixel are arranged in sequence in a column direction of the the pixel; or
the at least two display domains in each pixel are arranged in an array.

3. The array substrate according to claim 1, further comprising a gate driver connected to each gate line and a source driver connected to each data line, the source driver comprising a positive polarity source driver and a negative polarity source driver.

4. The array substrate according to claim 3, wherein the source driver that is connected with the data line corresponding to the at least two domains in one of two pixels adjacent to each other in a row direction has a polarity opposite to that of the source driver connected with the data line corresponding to the at least two domains in the other of the two pixels adjacent to each other in the row direction.

5. The array substrate according to claim 1, wherein the source driver that is connected with the data line corresponding to the at least two domains in one of two pixels adjacent to each other in a column direction has a polarity opposite to that of the source driver connected with the data line corresponding to the at least two domains in the other of two pixels adjacent to each other in the column direction.

6. The array substrate according to claim 3, wherein the source driver that is connected with the data line corresponding to one of two domains adjacent to each other in a row direction has a polarity opposite to that of the source driver connected with the data line corresponding to the other of the two domains adjacent to each other in the row direction.

7. The array substrate according to claim 1, wherein the source driver that is connected with the data line corresponding to one of two domains adjacent to each other in a column direction has a polarity opposite to that of the source driver connected with the data line corresponding to the other of the two domains adjacent to each other in the column direction.

8. A display panel, comprising the array substrate according to claim 1 and a color filter substrate that is assembled and connected with the array substrate, wherein the color filter substrate comprises a pluarilty of sub-pixel regions that are arranged in an array and an orthographic projection of each sub-pixel region on the array substrate covers two domains adjacent to each other.

9. The display panel according to claim 8, wherein the two domains adjacent to each other that are covered by the orthographic projection of each sub-pixel region on the array substrate are located in a same pixel of the array substrate.

10. The display panel according to claim 8, wherein the two domains adjacent to each other that are covered by the orthographic projection of each sub-pixel region on the array substrate are located in two pixels that are adjacent to each other on the array substrate.

11. A display device comprising
a display panel,
the display panel comprising includes:
an array substrate comprising a plurality of pixels arranged in an array, wherein a plurality of data lines are provided with two data lines between every two columns of pixels adjacent to each other and data lines at opposite sides of each column of pixels; a plurality of gate lines are provided with one gate line between every two rows of pixels adjacent to each other; each pixel of the plurality of pixels comprises at least two display domains and each display domain is correspondingly connected with a switch device; each of the display domains in each pixel is connected with one of the plurality of gate lines at a side of the pixel by a corresponding switch device; and each of the display domains in each pixel is connected with one of the plurality of data lines that is adjacent to the pixel and at a side of the pixel by a corresponding switch device;
wherein each switch device is a thin film transistor; and
wherein: channels in the thin film transistors corresponding respectively to the at least two domains in each pixel have a same width to length ratio: or channels in the thin film transistors corresponding respectively to the at least two domains in each pixel have width to length ratios that are different from one another; and
a color filter substrate that is assembled and connected with the array substrate;
wherein the color filter substrate comprises a plurality of sub-pixel regions that are arranged in an array and an orthographic projection of each sub-pixel region on the array substrate covers two domains adjacent to each other.

12. The array substrate according to claim 2, further comprising a gate driver connected to each gate line and a source driver connected to each data line, the source driver comprising a politive polarity source driver and a negative polarity source driver.

* * * * *